United States Patent [19]

Kleinberg

[11] Patent Number: 4,688,907
[45] Date of Patent: Aug. 25, 1987

[54] SYSTEM PROVIDING 3 IDENTICAL OPTICAL PATHS AND ADAPTED FOR A MICROSCOPE

[75] Inventor: Larry K. Kleinberg, Toluca Lake, Calif.

[73] Assignee: Urban Engineering Company, Inc., Burbank, Calif.

[21] Appl. No.: 818,527

[22] Filed: Jan. 10, 1986

[51] Int. Cl.$^4$ .................. G02B 21/22; G02B 27/10; G02B 21/36
[52] U.S. Cl. .................. 350/516; 350/502; 350/520; 350/539; 350/171; 350/173
[58] Field of Search .................. 350/511–516, 350/502, 520, 527, 523, 539, 173, 171

[56] References Cited

U.S. PATENT DOCUMENTS

| | | | |
|---|---|---|---|
| 3,186,300 | 6/1965 | Littmann | 350/515 |
| 4,035,057 | 7/1977 | Klein | 350/522 |
| 4,138,191 | 2/1979 | Peyman et al. | 350/516 |
| 4,167,302 | 9/1979 | Karasawa | 350/516 |
| 4,232,933 | 11/1980 | Nakahashi | 350/523 |
| 4,262,989 | 4/1981 | Waters | 350/516 |
| 4,341,435 | 7/1982 | Lang et al. | 350/515 |
| 4,412,727 | 11/1983 | Taira | 350/522 |
| 4,448,498 | 5/1984 | Muller et al. | 350/516 |
| 4,605,287 | 8/1986 | Lang et al. | 350/522 |
| 4,606,617 | 8/1986 | Machel | 350/527 |

FOREIGN PATENT DOCUMENTS

| | | | |
|---|---|---|---|
| 1217099 | 5/1966 | Fed. Rep. of Germany | 350/516 |
| 3333471 | 4/1985 | Fed. Rep. of Germany | 350/522 |

OTHER PUBLICATIONS

"Assistant's Viewing Tube . . . ", Littmann et al., Zeiss Info., Germany, pp. 5–12, Sep. 1970.

*Primary Examiner*—Jon W. Henry
*Attorney, Agent, or Firm*—Harness, Dickey & Pierce

[57] ABSTRACT

An optical system or apparatus whereby 3 identical optical trains or paths of light providing steropsis are obtained for surgery and other uses, and by which four (4) viewing stations with balanced light are achieved. Documentation devices and observers see the target or object area as viewed at these stations. The apparatus comprises a housing having a chamber divided into two communicable cavities at an obtuse angle to one another, with four viewing stations mounted on the housing having access to the chamber and cavities in which a network of prisms is located to provide redirection of light in a balanced manner to all four viewing stations. Light is introduced through an opening or a set of three ports on the base of the housing, and is channelled to the port stations by the network of prisms. One of the three ports is common to a first port at two of the port stations each of which comprises a pair of ports, these pairs of ports being on different planes to one another, and at which steropsis is achieved. Each of the remaining two port stations, at which monocular vision is obtained, comprises a single port geometrically oriented correspondingly to second ports in such pairs of ports and to the remaining two ports of the set of three ports. The set of three ports is aligned with a microscope body containing a turret of lenses or zoom pods by which magnification for viewing occurs in the system. The network of prisms mounted in the chamber and its two cavities provides balancing of the light from the three identical optical trains or paths through all four viewing stations.

11 Claims, 13 Drawing Figures

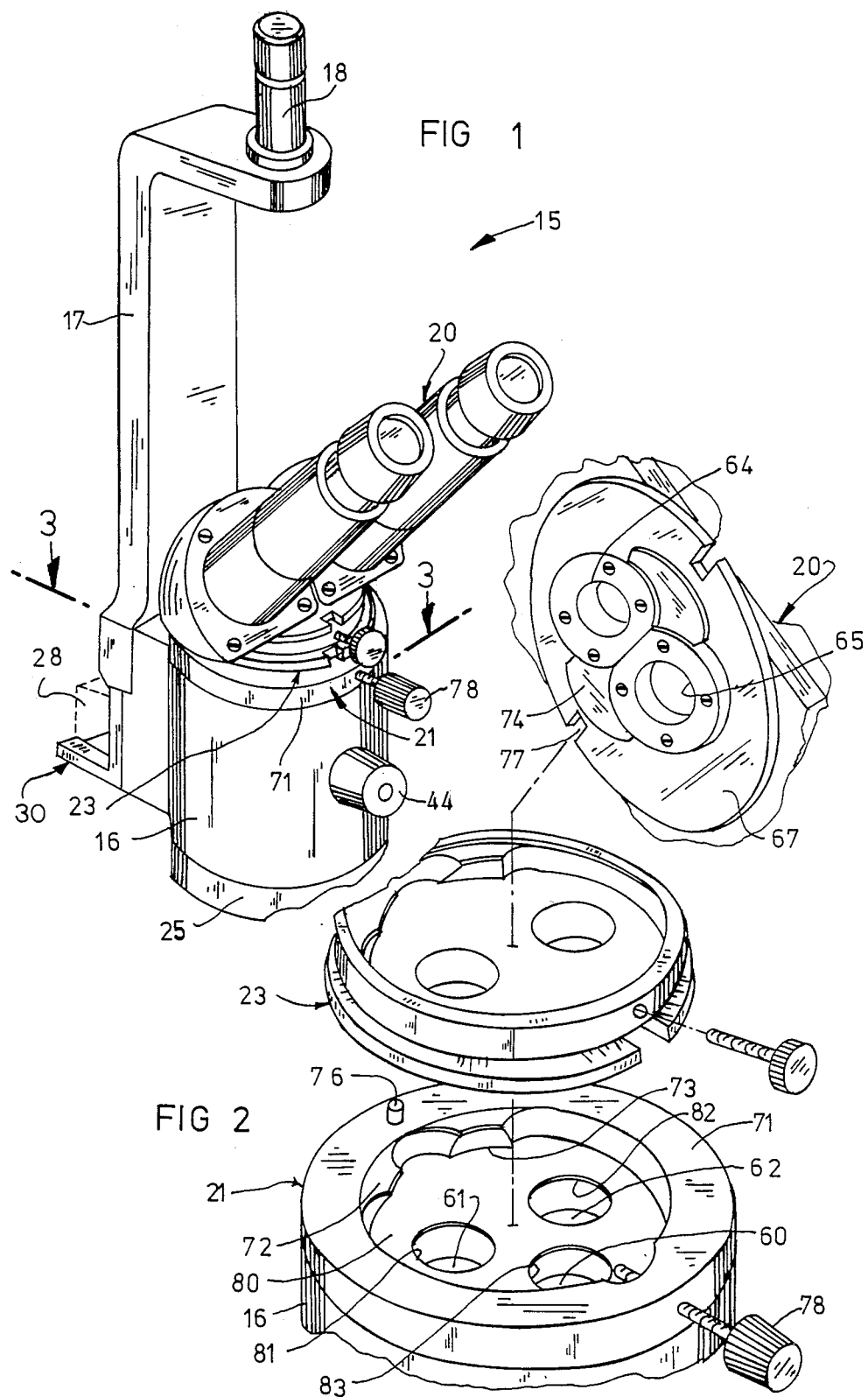

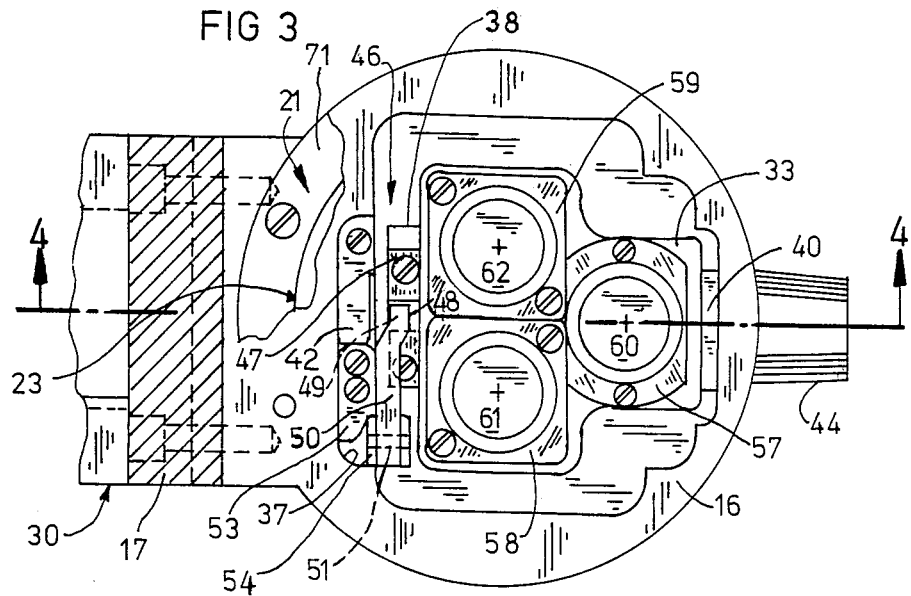
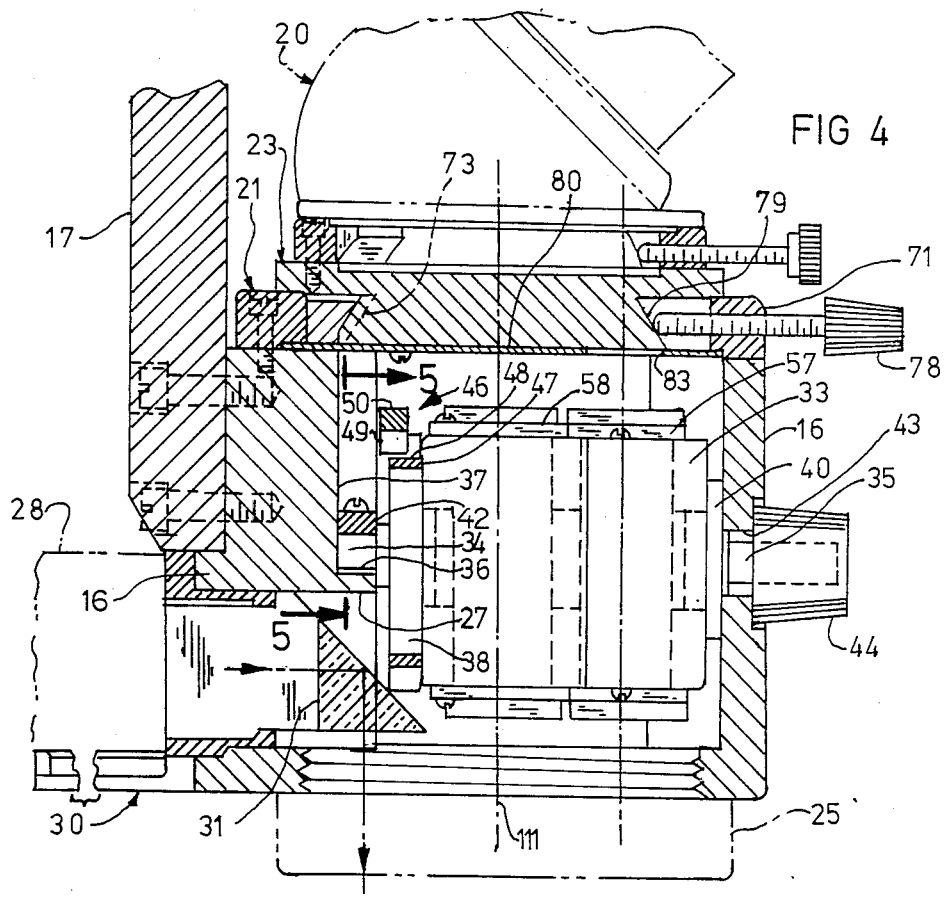

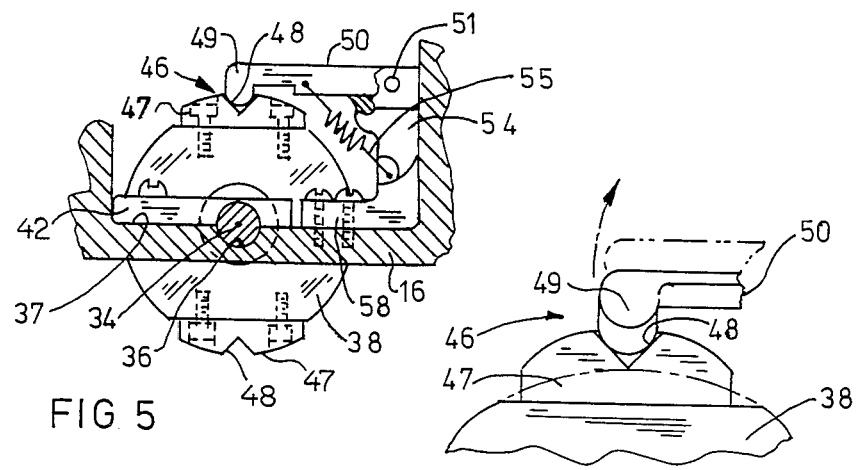
FIG 5
FIG 6
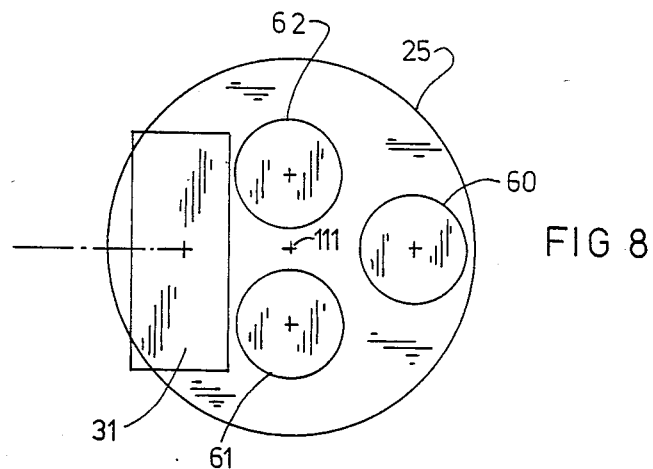
FIG 8
FIG 7
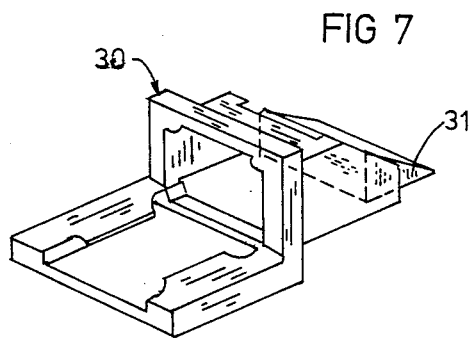

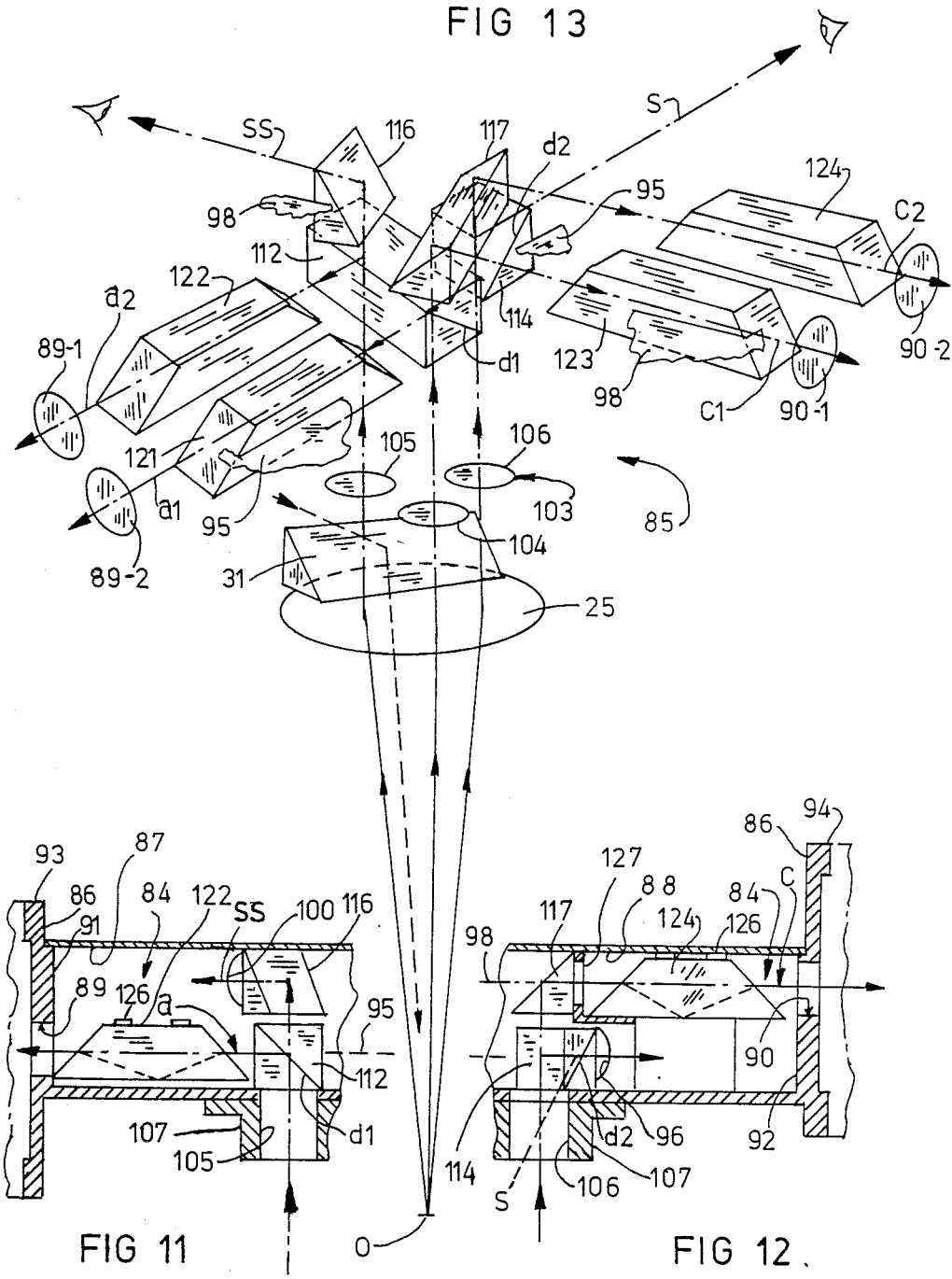

SYSTEM PROVIDING 3 IDENTICAL OPTICAL PATHS AND ADAPTED FOR A MICROSCOPE

TECHNICAL FIELD

This invention is directed to microscopes primarily adapted for surgical procedures, and in particular, to ophthomological procedures; the invention is also directed to stereopsis at two viewing stations in a microscope system, obtained by means of a beam splitting optical network, while also attaining monocular vision at one or more other viewing stations.

DISCLOSURE OF THE INVENTION

A. Background

In the practice of ophthomology, assistant surgeons, nurses, students, and other technical personnel are involved with the primary surgeon during the performance of surgical procedures upon the eye, or upon any other generally relatively flat surface or tissue to be treated. To date, no true stereoptic vision has been made available other than to the primary surgeon through a single binocular assembly. Monocular vision has been provided through, for example, a documentation device or an observer's tube coupled to the single binocular assembly. However, only to that extent has another human being other than the primary surgeon observe such treatment or surgical procedure.

These disadvantages, and others, constituted problems for the surgeons in surgical procedures. The advantages of this invention overcome them, by providing stereopsis to at least two observers or surgeons, while in addition providing monocular vision for doucmentation devices, observers' tubes and the like.

Also, though assistant surgeons would observe the procedure, such observations occurred through systems that developed a psuedo-stereoptic vision of the same field, while being stationed 180 degrees to that of the position for the primary surgeon and at a different level than that of the primary surgeon.

B. Summary of The Invention

This invention is directed to a binocular assembly-beam splitting system which is interchangable between utilization by itself of the binocular assembly which includes two magnification settings and use of two pairs of binoculars with the same magnification settings in conjunction or combination with a beam splitting network of optical elements by which stereopsis is achieved for both pairs of binoculars and monocular vision at additional viewing ports, available for either documentation devices or observer tubes.

The binocular assembly includes a hollow body containing a turret with three sets of lenses mounted therein, the turret capable of being indexed or located at two distinct and precise positions 180 degrees apart, simply by rotating the turret. A locating means for precisly indexing the turret to each of its magnification settings is provided. An objective lens is mounted below the hollow body while a right angle prism is situated above the objective lens for introduction of additional light by means of a light module detachably mounted to the hollow body. The binoculars themselves is detachably mounted to the top of the hollow body containing the turret, and has its two ports in co-axial alignment with two of the three sets of lenses mounted in the turret. Thus, light from an object, such as the eye, is directed through the lenses in the turret into the binoculars for viewing by one surgeon.

A unique construction of detachably mounting the binoculars upon the hollow body is included.

A beam splitter is readily substituted for a single pair of binocular mounted on the hollow body, and includes a network of optical elements by which beams of light transmitted from the object are split in four different directions. Stereoscopic vision is attained in two of these directions while monocular vision becomes available in another two directions.

The two viewing stations at which stereopsis occurs are but 120 degrees apart and are at the same level for two surgeons, a distinct advantage. Further, with this system, only one microscope body, containing the magnification means, is necessary and removes requirements for two distinct systems and magnification means to achieve stereopsis in more than one pair of binoculars.

An object of the invention is to provide stereoscopic vision at two different viewing stations in a microscope apparatus or system.

A further object of this invention is to provide interchangability between a stereoscopic binocular and a system providing more than one stereoscopic viewing station and in which magnification is desired.

A still further object of the invention is to provide a novel network of optical elements by which stereoscopic vision at more than one viewing station is obtained.

A further object of the invention is to provide a novel manner or method by which stereoscopic vision is achieved through a network of optical elements.

Another object of the invention is to provide a balances of light at each of a number of viewing stations in a microscope system including binocular assemblies and a beam-splitting network of optical elements.

A further object of the invention is to provide three optical paths that are identical and coherent in a magnification system adapted for a microscope assembly and for a beam splitting system adaptable to the microscope assembly or other apparatus.

These and other objects and advantages of the invention will become more fully apparent by a full and complete reading of the following specification, appended claims thereto and the accompanying drawing comprising by five (5) sheets.

BRIEF DESCRIPTION OF THE DRAWING

FIG. 1 is a perspective view of an embodiment of the invention.

FIG. 2 is an exploded fragmentary view of a portion of the embodiment shown in FIG. 1.

FIG. 3 is a view taken on line 3—3 of FIG. 1.

FIG. 4 is a view taken on line 4—4 of FIG. 3.

FIG. 5 is a view taken on line 5—5 of FIG. 4.

FIG. 6 is an enlarged fragmentary view of a portion of FIG. 5.

FIG. 7 is a perspective view of a prism unit to which a module producing light from a source is applied to the invention.

FIG. 8 is a diagrammatic view of the prism in FIG. 7 in relation to an objective lens and positions of three turret lenses of the invention.

FIG. 11 is a view taken on line 11—11 of FIG. 10.

FIG. 12 is a view taken on line 12—12 of FIG. 10.

FIG. 13 is a schematic diagram of a network of optical elements or prisms forming the beam splitter of the invention.

BEST MODE OF CARRYING OUT THE INVENTION

Figure 9:
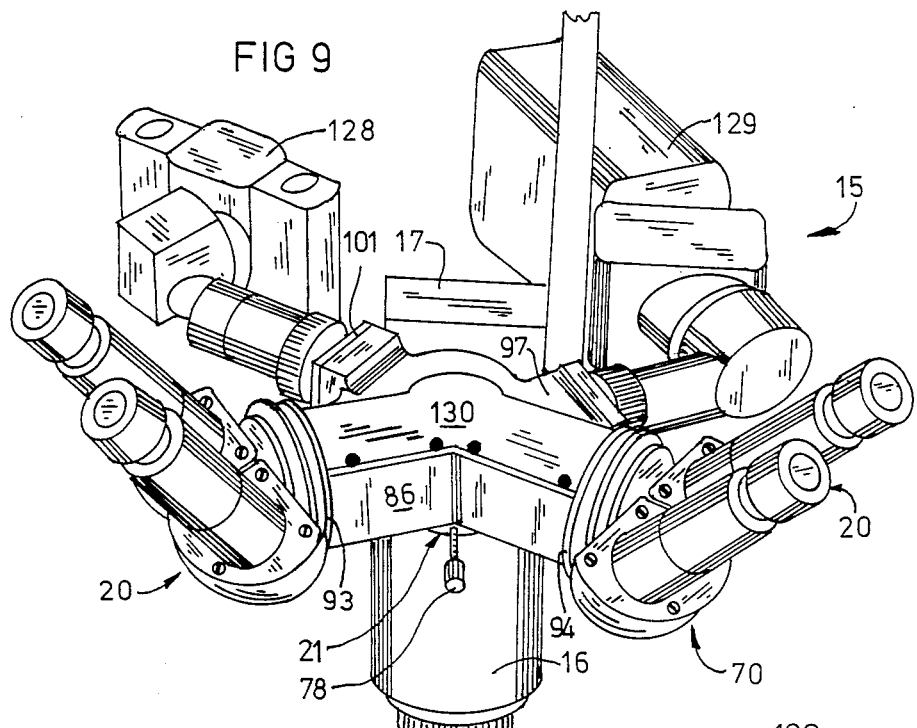
FIG. 9 is a perspective view of another embodiment of the invention in a full extent of its use.

Refering now to the drawing wherein reference characters refer to like numerals hereinafter set down, FIG. 1 shows an embodiment 15 of the invention as assembled for a mode of use by one person only. Apparatus/system 15 generally comprises a hollow body 16 securely mounted to a support arm 17 having a support post 18 which is received in a socket in a microscope stand (not shown as it is not a part of this invention), a binocular assembly 20 inclined in this embodiment, but not limited to such inclination, detachably mounted to body 16 via either a direct coupling to a receptor 21, FIG. 2, or an adaptor 23, in the instances that binocular assembly 20 is of a make or specifications not corresponding to the dimensional specifications of receptor 21. An objective lens 25 detachably mounts to and at the bottom of body 16.

An opening 27 FIG. 4, is provided in body 16 for suitably attaching a light source module 28 that is detachably mounted to a bracket member 30 FIG. 7, having a right angle prism 31 secured thereto for entry through opening 27 to a position above objective lens 25. Light thus is transmittable from module 28 into prism 31 which re-directs such light through objective lens 25, FIGS. 4, 13, to an object O, such as an eye, under going surgery, or to other relatively flat area being surgically treated.

A turret 33, FIGS. 3, 4, is housed within hollow body 16 and is rotatably mounted about a pair of pivot shafts 34 and 35 co-axially related to one another. Shaft 34 is seated in a semi-circular depression 36, FIG. 5, below a recess 37 FIG. 4, formed in an interior wall of hollow body 16. A mounting member 38, preferably integrally formed of shaft 34, centers turret 33 as well as securing it to shaft 34. Shaft 35 includes a similar, though smaller, mounting member 40 by which it also assists in centering turret 33 in addition to securing turret 33 to it. These securements are made with suitably sized screws.

A bracket 42, FIG. 5, bearing against and secured to the base forming recess 37 in body 16, maintains shaft 34 in its rotating position. Shaft 35, FIG. 4, includes a suitable bushing (not shown) which seats in a bore 43, FIG. 4, formed in body 16, to maintain its rotational function, a knob 44 being secured on shaft 35, and by which turret 33 can be rotated.

A means 46 for locating turret 33 precisely in one of two 180 degree positions is illustrated in FIGS. 3, 4, 5. Each of 2 locators 47 is in an opposing relation to the other one, each being secured to mounting member 38 that is secured to the vertically-oriented wall of turret 33. Each locator 47 includes a notch 48 for a head 49 on one end of a detent arm 50 to engage, and thereby locate mounting member 38, and thus, turret 33. The other end of detent arm 50 is pivotally connected as at 51 to an upstanding generally L-shaped bracket member the base 53 of which is secured, FIGS. 5, 3, to the interior wall of body 16 forming the base of recess 37. The L-shaped bracket member includes an inclined or off-set leg portion 54 joining its upper most portion, about which detent arm 50 pivots, to its base 53, in view of the fact that mounting member 38 and recess 37 (thus, the base forming such recess) are in side-by-side relationship to one another rather than in planar relationship to each other. A spring 55 mounted to and between detent arm 50 and leg portion 54 provides the necessary bias to retain head 49 in a notch 48 of a locator 47 while nevertheless yielding to the rotational movements of shafts 34, 35 upon application of turning force on shaft 35 or its knob 44.

Suitably securely mounted on turret 33 are pairs of lens cages 57, 58, 59, each lens cage in a pair opposing and in axial alignment with the other, and by which magnification is achieved. These sets of cages, each pair constituting a set, hold suitable and known pairs of axially-aligned lenses 60, 61, 62 by which a desired magnification is achieved.

Thus, three optical trains of light are provided through turret 33 by means of these three sets of two lenses each. These pairs of lenses 60, 61, 62 are in alignment with objective lens 25 below turret 33. Pairs of lenses 61, 62 are in axial alignment with two ports 64, 65, FIG. 2, provided in a base member 67 of binocular assembly 20, while all three pairs of lenses 60, 61, 62 are in axial alignment with corresponding ports in a set of three ports generated in a beam-splitter 70, FIGS. 9-13, all of which being more fully described hereinafter.

At the top of body 16, a receptor 21 is securely mounted thereto for detachably receiving directly a binocular assembly 20 of a beam-splitter 70, FIG. 9-13. Receptor 21 comprises an annular collar 71 in which is formed a pair of spaced female dovetail members 72, 73 with which a corresponding male dovetail member 74 mounted on base member 67 FIG. 2, of the binocular assembly 20 (as well as on a base for adaptor 23, not visible) mates in assembly. A head in 76 mounted on the top wall of receptor 21 receives a matching notch 77 in base member 67. A thumb screw 78 projects through annular collar 21 opposing head pin 76, to seat on a wall taper 79, FIG. 4, formed on base member 67 when binocular assembly 20 is assembled to body 16, and to turret 33; and in more particular, so that the two ports 64, 65 in assembly 20 axially align with the two lenses 61, 62, respectively, in such assembly. An aluminum mask 80 is preferably used, suitably securely seated in a conntersunk bore (not shown) of shim dimension on the underside of receptor 21, and includes three apertures 81, 82, 83 the axes of which correspond to corresponding axes of the lenses 61, 62, and 63 in turret 33. Mask 80 is black anodized to reduce scattered light in the operation of apparatus 15.

Adaptor 23 contains features similar to or like those in base member 67 of binocular assembly 20, to couple an assembly 20 which is not of a make or model engineered to the specifications of receptor 21, and by its utilization, such a binocular assembly 20 is available for use with microscope body 16. These types of adaptors are well known in the art also include port arrangements and alignments corresponding to ports 64, 65 in an assembly 20 designed and engineered to body 16.

FIGS. 9-13 illustrate beam splitter 70, having an optical chamber 84 in which splitting of beams of light occur through the work of a network 85 of optical elements or prisms mounted within beam splitter 70, to achieve a full stereopsis for a pair of binocular assemblies 20 at two viewing stations and monocular vision for two other viewing stations, all with balanced light, i.e., light equally divided among all ports at the viewing stations. Beam splitter 70 comprises a housing 86 having chamber 84 divided into two cavities 87, 88, communicable with each other, the cavities' axes forming a substantial obtuse angle, for example, say, 120 degrees to each other. At the outer ends of cavities 87, 88, first and second pairs 89, 90 of ports, respectively, are generated in their corresponding end walls 91, 92 forming such cavities and in members 93, 94 which are securely mounted to such housing end walls. Members 93, 94 constitute viewing stations and mount binocular assemblies 20 in suitable and known manner to beam splitter 70.

The axes a1, a2 of the two ports 89-1, 89-2 in the pair 89 of ports lie in a first plane 95 which contains also the axis s for a single port 96 generated in a protruding boss 97, which constitutes another viewing station, boss 97 projecting from housing 85 in opposing relation to the pair 89 of ports generated at the outer end of cavity 87. The axes a1, a2, s for all of these ports 89-1, 89-2, and 96 are parallel to one another.

The axes c1, c2 of the two ports 90-1, 90-2 in the pair 90 of ports lie in a second plane 98 parallel to plane 95, plane 98 also containing the axis ss for a single port 100 generated in a protruding boss 101, which constitutes a viewing station, the boss 101 projecting from housing 85 in opposing relation to the pair 90 of ports generated at the outer end of cavity 88. The axes c1, c2, ss for these ports 90-1, 90-2 and 100 are parallel to one another.

In the proximity of the juncture of cavities 87, 88, a set 103 of three ports 104, 105, 106 is generated in housing 86 and in a female member 107 securely mounted to housing 86 for attaching it to receptor 21 on body 16. Female member 107 is similar in kind and function to base member 67, and includes a notch 108, FIG. 10, for matching with pin 76 on receptor 21 and a wall taper (not shown), like the wall taper 79 (FIG. 4) in base member 67, for cooperating with thumb screw 78 to properly position beam splitter 70 upon body 16; and in more particular, with ports 104, 105, 106 being in coaxial alignment with corresponding lenses 60, 61, 62, respectively, in turret 33. The three axes of ports 104, 105, 106 are perpendicular to planes 95 and 98 and perpendicular to the axes of the ports in the pairs 89, 90 of ports. The axes of the three ports 104, 105, 106 form apices of an equillateral triangle, with a midpoint 111, FIG. 8, between the axes of ports 105, 106, coincident upon the axis of objective lens 25. It now should be apparent that the axes of lenses 60, 61, 62 also form apices of an equilateral triangle which can be superimposed on those for ports 104, 105, 106, respectively.

Figure 10:
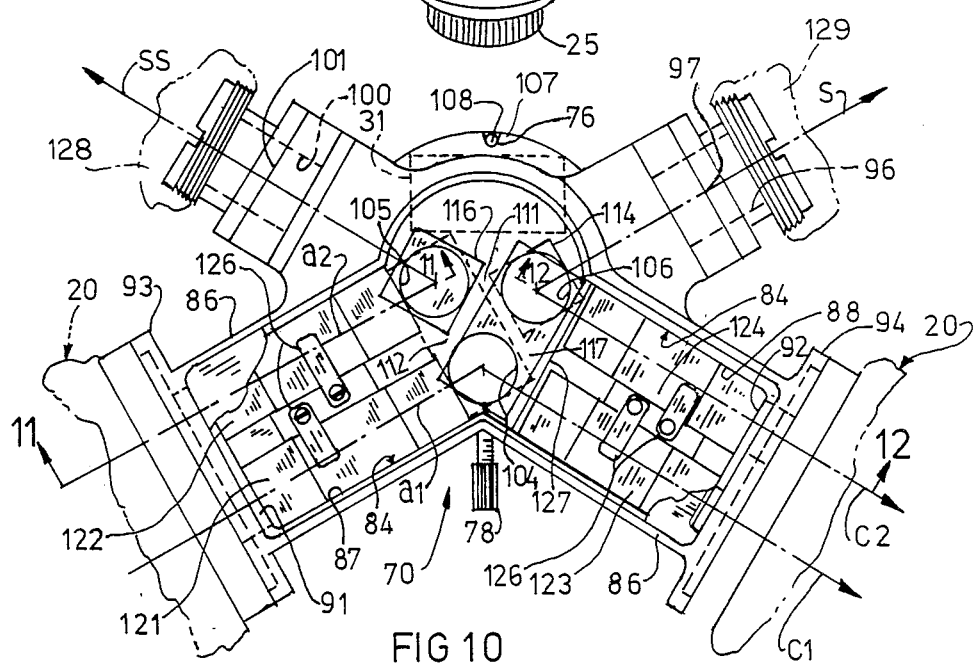
FIG. 10 is a view of a beam splitter in the invention.

It will be observed from FIGS. 10, 13 that port 104 has its axis intersecting the axes a1, c1 of ports 89-1, 90-1 in both pairs 89, 90 of ports, although the plane 95 for axis a1 does not lie in plane 98 for axis c1. The axis for port 105 intersects both the axis ss of the single port 100 in boss 101 and the axis a2 of port 89-2, while the third port 106 has its axis intersecting both the axis s of the single port 96 in boss 97 and the axis c2 of port 90-2.

It now should be apparent that port 104 is common to first ports 89-1, 90-1 in each pair 89, 90 of ports, whereas, the other two ports 105, 106 are not common to both pairs 89, 90 of ports.

As further seen in FIGS. 9–13, network 85 of optical prisms is mounted within housing 86, being suitably secured in known manner in place in cavities 87, 88 and across their juncture. A square parallelepiped prism 112 having a partial mirror coating along its diagonal plane d1 is positioned in alignment with ports 104 and 105, while a parallelpiped prism 114, also including a partial mirror coating along its diagonal plane d2, is positioned in alignment over port 106. These parallelepiped prisms 112, 114 are disposed in plane 95.

Disposed in aligned positions above parallelepiped prisms 112, 114 and in plane 98, are right angle prisms 116, 117. Prism 116 is so positioned over parallelpiped parallelepiped prism 112 such that is captures a remaining portion of a light ray proceeding from port 105 to and through prism 112, and re-directs the ray of light through port 100, FIG. 11, towards viewing station 101. Right angle prism 117 is so positioned over both parallelepiped prisms 112, 114 such that it captures remaining portions of light rays proceeding from ports 104, 106 to and through corresponding parallelepiped prisms 112, 114, as seen in FIG. 13, and re-directs these corresponding rays of light towards ports 90-1, 90-2, respectively.

The immediate portions of light rays captured by cube prisms 112, 114 are re-directed from state-of-the art partial mirror coatings (not shown) mounted on their respective diagonal planes d1, d2, in directions along plane 95, i.e., towards ports 89-1, 89-2 and port 96. In more particular, immediate portions of light rays proceeding from port 104, 105 are captured by prism 112 and re-directed towards ports 89-1, 89-2, respectively, while immediate portions of light rays proceeding from port 106 is captured by prism 114 and re-directed towards port 96 and viewing station 97.

A pair of dove prisms 121, 122 is located in cavity 87, along plane 95 containing axes a1, a2 for ports 89-1, 89-2, and are utilized to erect steroscopic images of object O, FIG. 13, for proper viewing at port station 93. Likewise, another pair of dove prisms 123, 124 are disposed in cavity 88, along plane 98 containing the axes c1, c2 for ports 90-1, 90-2, also utilized to erect stereoscopic images of object O for proper viewing at port station 94.

The aforescribed optical elements are retained and positioned in housing by suitable clip members 126, FIG. 10, and brackets 127, FIG. 12, secured to housing 86, these means being well-known expedients for such purposes in the art. Air gaps are provided among and between these optical elements in order to manipulate them into precise setting dg assembly of them in housing 86, for splitting beams of light, and once in place, they are epoxied to maintain such setting. A cover 130 for closing housing 86, FIG. 9, eliminates contamination of the optical element, however, is not of essence of the invention.

In operation, without the beam splitter 70 mounted over body 16 but with a binocular assembly 20 mounted thereon, light at object O, whether supplied via prism 31 through objective lens 25 or by outside the described system, returns or is directed through lens 25, through lenses 61, 62 in turret 33, and then to and through ports 64, 65 of the binocular assembly 20, to be viewed as an image of object O by the observer or surgeon. Turret 33 is positioned in one of two settings. A first setting provides a low field and a high magnification to the observer through binocular assembly 20. In the other setting for turret 33, a large field of view and a low magnification is obtained. Rotation of knob 35 provides the wherewithal for turret 33 to be positioned in either one of its two settings. A knob 35 is turned, the bias of spring 35 yielding to movement of locator 47, head 49 being thrust out of its notch 48, thereby providing for continued rotation of turret 33 until the other locator 47 and its notch 48 engages the head 49 of detent arm 50. Turret 33 thus is indexed to its second setting.

With use of beam splitter 70, the binocular assembly 20 of FIG. 1 is removed from its mounting of receptor 21 of body 16, and beam splitter 70 is substituted therefore. A second assembly 20 and documentation devices 128, 129 suitably are mounted at viewing stations 101, 97, respectively, to beam splitter 70 in the manner shown in FIGS. 9, 10. In this instance of use, the third set of lenses 60 in turret 33 is utilized. As light reflects from ob O, FIG. 13, its rays pass through objective lens 25 and through each set of lenses 60, 61, 62, in turret 33. These rays of light continue then, passing through ports 104, 105, 106 of set 103 mounted in beam splitter 70, to be captured by the network 85 of optical elements. Light passes through ports 104, 105, entering parallelepiped prism 112. Portions of these rays are re-directed, off of partial mirror coating d1, to dove prisms 121, 122, for erection of the image being viewed at object O, and thence to the two ports 89-1, 89-2, respectively, to be received at viewing station 93 in a stereoptic manner. The remaining portions of these rays continue upwardly to be captured by right angle prisms 116, 117. The light ray captured by prism 116 is re-directed through single port 100 for monocular viewing at viewing station 101. The light ray from port 104 which enters cube prism 117 is re-directed towards port 90-1, entering dove prism 123 for erection of the image being viewed at object O.

The light ray from port 106 enters parallelepiped prism 114. Its immediate portion is re-directed, off of partial mirror coating on diagonal plane d2, into single port 96 for monocular vision at viewing station 97. The light ray's remaining portion continues through partial mirror coating at diagonal plane d, into right angle prism 117, which re-directs this remaining portion to dove prism 124 which provides erection of the image at object O before the image is viewed at station 94. Stereoscopic vision occurs at station 94.

The assembly of the system now is apparent from the above description, however, briefly, binocular assembly 20 is mounted to receptor 21 on body 16 by first slightly tilting same so that male dovetail member 74 slips between and under spaced female dovetail members 72, 73, notch 77 matching upon pin 76. Thumb screw 78 then is tightened against taper wall 79 of base 67. The necessary lenses and ports now are properly aligned. Objective lens 25 is suitably secured, such as by threading of its casing (not shown) to body 16, as shown in FIG. 4. Bracket member 30, which mounts prism 31, as well as a mounted module 28 providing light from a suitable source, is detachably mounted to opening 27. Body 16 previously is securely mounted to support arm 17.

Beam splitter 70 is readily substituted upon body 16 for binocular assembly 20, and is assembled to body 16 in the same fashion as a binocular assembly 20 is mounted thereto.

Standard manufacturing processes, techniques and suitable, known materials are used to make binocular assembly 20, as well as for those elements thereof hereinafter claimed. Housing 86 may be cast or machined. Other aforesaid described elements incorporated with beam splitter 70 may be machined as well. The optical elements, i.e., the prisms and the partial mirror coating included in beam splitter 70, are state-of-the-art prisms and coatings.

Various changes and modifications can be made in the invention within its spirit and scope. For example front coated mirrors may be substituted for the prism means. Zoom pods can be substituted for the sets of lenses in the turret. Gimbal expedients may be substituted for the brackets and clips to secure the prisms in their housing.

INDUSTRIAL APPLICATION

The invention is utilized in surgical procedures, however, it is readily available for use in other arts, such as in the science arts, wherever a binocular assembly and magnification of field of vision is required.

I claim:

1. A beam splitter comprising:

a housing having a chamber divided into two communicable cavities their juncture forming a substantial obtuse angle, a pair of ports mounted in said housing at each end of the cavities opposite from their juncture, a plane for the first pair of such ports being parallel to a different plane for the second pair of such ports, a first single port mounted in said housing disposed in opposing relation to and with its axis lying in the same plane for said first pair or ports, a second single port mounted in said housing disposed in opposing relation to and with its axis lying in the same plane for said second pair of ports, a set of light entry ports mounted in said housing their axes perpendicular to the planes and axes of both pairs of said ports and of said first and second single ports, a first port in said set having its axis intersecting the axes of first ports in said first and second pairs of ports, another port in said set having its axis intersecting the axis of the first single port and the axis of the second port of said first pair of ports, and a third port in said set having its axis intersecting the axis of the second single port and the axis of the second port of said second pair of ports, and a network of prisms mounted in the cavities and across their juncture in said housing for dividing beams of light entering through said set of three ports and redirecting in a balanced manner their light through said first and second pairs of ports and first and second single ports.

2. A network of optical prisms for splitting light rays in a balanced manner comprising:

prism means common to at least three paths of light rays whereby a portion of each of such three paths of light rays is re-directed in a distinct path while the remaining portion of each of such three paths passes through said prism means, optical means in alignment with the remaining portion of each of such three paths for capturing such remaining portions, a first dove prism means for correspondingly capturing the re-directed portion of a first and second of the three paths of light rays from said prism means, a second dove prism means for correspondingly capturing the remaining portions of the first and a third path of the three paths of light rays from said optical means, said first and second dove prism means being disposed on different planes from one another, the remaining portion of the second path of the three light rays being re-directed in a distinct direction from said optical means, the re-directed portion of the third path of the three light rays being re-directed in another distinct direction from said prism means.

3. The network of claim 2 in combination with means for transmitting light rays to the network.

4. The combination of claim 3 wherein said transmitting means comprises an objective lens.

5. The subject matter of claim 2 or claim 3 or claim 4 wherein said optical means comprises right angle prisms.

6. The subject matter of claim 2 or claim 3 or claim 4 wherein said optical means comprises front surface mirrors.

7. The subject matter of claim 2 or claim 3 or claim 4 wherein said prism means comprises a square parallelepiped cube prism and a cube prism.

8. A stereoscopic assembly for a microscope comprising:
- a hollow body containing a turret in which three sets of magnifying lenses are mounted,
- a beam splitter mounted on said body and which includes viewing stations to which light in a balanced manner is transmitted from said sets of lenses,
- said beam splitter further comprising a network of optical prisms including prism means common to at least three paths of light rays for intercepting a portion of the light rays, and first and second dove prism means for directing portions of the light rays to produce balanced light to said viewing stations, and
- means for transmitting light to said beam splitter.

9. A stereoscopic assembly of claim 8 wherein three sets of viewing stations are provided, two pairs of binoculars mounted at two of said viewing stations, and a documentation device mounted at the third viewing station.

10. The stereoscopic microscope assembly of claim 8 or claim 9 wherein said network of optical prisms further comprises said prism means common to at least three paths of light rays whereby a portion of each of such three paths of light rays is re-directed in a distinct path while the remaining portion of each of such three paths passes through said prism means, optical means in alignment with the remaining portion of each of such three paths for capturing such remaining portions,
- said first dove prism means for correspondingly capturing the re-directed portion of a first and a second of the three paths of light rays from said prism means,
- said second dove prism means for correspondingly capturing the remaining portions of the first and a third path of the three paths of light rays from said optical means,
- said first and second dove prism means being disposed on different planes from one another,
- the remaining portion of the second path of the three light rays being re-directed in a distinct direction from said optical means,
- the re-directed portion of the third path of the three light rays being re-directed in another distinct direction from said prism means,
- the three rays of light being transmitted from said three sets of magnifying lenses.

11. A method of providing stereopsis and monocular vision for an image of an object through a network of optical elements comprising:
- directing light from an object towards such network by at least three rays of light,
- splitting the first two of such rays by parallelepiped prism means into immediate and remaining portions of light,
- re-directing immediate portions of two of such rays into dove prism means on one plane for erecting a stereoscopic image of the object at a first viewing station while re-directing the immediate portion of the third ray into a single port on the same plane providing monocular vision at a second viewing station,
- passing remaining portions of the three rays through said parallelepiped prism means,
- capturing such remaining portions in right angle prism means on a second plane,
- re-directing such remaining portions from the right angle prism means the remaining portions of the first and third rays proceeding through another dove prism means for erecting a stereoscopic image of the object at a third viewing station, the remaining portion of the second ray being re-directed into a second single port providing monocular vision at a fourth viewing station.

* * * * *

UNITED STATES PATENT AND TRADEMARK OFFICE
CERTIFICATE OF CORRECTION

PATENT NO. : 4,688,907

DATED : August 25, 1987

INVENTOR(S) : Larry K. Kleinberg

It is certified that error appears in the above-identified patent and that said Letters Patent is hereby corrected as shown below:

Abstract:

Line 2,      "steropsis" should be --stereopsis--

Line 19,      "steropsis" should be --stereopsis--

Line 9,      "on" should be --in--

Col. 1, Line 29,      "observe" should be --observed--

Col. 1, Line 34,      "doucmentation" should be --documentation--

Col. 1, Line 65,      "is" should be --are--

Col. 2, Line 6,      "binocular" should be --binoculars--

Col. 2, Line 34-35,      "balances" should be --balance--

Col. 2, Line 48,      "Drawing" should be --drawings--

UNITED STATES PATENT AND TRADEMARK OFFICE
CERTIFICATE OF CORRECTION

PATENT NO. : 4,688,907
DATED : August 25, 1987
INVENTOR(S) : Larry K. Kleinberg

It is certified that error appears in the above-identified patent and that said Letters Patent is hereby corrected as shown below:

Col. 4; Line 27,   "of" should be --or--

Col. 4, Line 33,   insert "pin" after "head"

Col. 4, Line 43,   "conntersunk" should be --countersunk--

Col. 5, Line 67,   "parallelpiped" should be --parallelepiped--

Col. 6, Line 5,    delete "parallelpiped"

Col. 6, Line 6,    "is" should be --it--

Col. 6, Line 22,   "port" should be --ports--

Col. 6, Line 29,   "steroscopic" shold be --stereoscopic--

Col. 6, Lines 33-34,   "steroscopic" should be --stereoscopic--

Col. 7, Line 2,    "of" should be --on-- (second occurrence)

Col. 7, Line 33,   "d," should be --d2,--

Col. 6, Line 22,   "port" should be --ports--

UNITED STATES PATENT AND TRADEMARK OFFICE
CERTIFICATE OF CORRECTION

PATENT NO. : 4,688,907        Page 3 of 3

DATED : August 35, 1987

INVENTOR(S) : Larry K. Kleinburg

It is certified that error appears in the above-identified patent and that said Letters Patent is hereby corrected as shown below:

Col. 6, Line 29,             "steroscopic" should be —stereoscopic—

Col. 6, Line 33-34,         "steroscopic" should be —stereoscopic—

Col. 7, Line 2,              "of" should be —on—(2nd occurrence)

Col. 7, Line 33,            "d," should be —d2,—

Signed and Sealed this

Nineteenth Day of April, 1988

Attest:

DONALD J. QUIGG

Attesting Officer      Commissioner of Patents and Trademarks